United States Patent [19]

Kallas

[11] 4,173,493
[45] Nov. 6, 1979

[54] RECLAMATION OF CONDUCTIVE WIRE FROM CABLE

[75] Inventor: William C. Kallas, Park Ridge, Ill.

[73] Assignee: Lissner Corporation, Chicago, Ill.

[21] Appl. No.: 817,722

[22] Filed: Jul. 21, 1977

[51] Int. Cl.² .......................... B08B 5/00; B08B 7/00; B08B 3/00
[52] U.S. Cl. ........................................ 134/11; 134/12; 134/25 R; 134/40; 134/65; 134/104; 134/107
[58] Field of Search ................... 134/11, 31, 12, 25 R, 134/10, 32, 40, 18, 65, 104, 107, 108, 132; 209/3; 241/24, 20

[56] References Cited

U.S. PATENT DOCUMENTS

| | | | |
|---|---|---|---|
| 1,580,723 | 4/1926 | Hapgood | 134/18 |
| 2,089,102 | 8/1937 | Savage | 134/65 |
| 2,689,198 | 9/1954 | Judd | 134/31 |
| 2,896,640 | 7/1959 | Randall et al. | 134/31 |
| 3,242,057 | 3/1966 | Talian et al. | 134/65 |
| 3,434,881 | 3/1969 | Smith | 134/12 |
| 3,498,839 | 3/1970 | Mehta | 134/25 R |
| 3,754,559 | 8/1973 | Seiwert | 134/104 |

FOREIGN PATENT DOCUMENTS

| | | | |
|---|---|---|---|
| 2343345 | 8/1974 | Fed. Rep. of Germany | 241/24 |
| 935726 | 6/1948 | France | 134/25 |

Primary Examiner—Joseph Scovronek
Assistant Examiner—Chris Konkol
Attorney, Agent, or Firm—Michael G. Berkman

[57] ABSTRACT

A process and apparatus for the recovery, for re-use, of metallic conductors such as copper and aluminum from insulated cable, particularly scrap telephone cable, the process utilizing a unique combination of mechanical and chemical operations protective of both the recovered metals and the environment. The invention has particular utility in the processing of cable of the type which includes as a filler a petroleum gel or similar material employed as a moisture barrier. It is an important feature of the invention that this petroleum jelly or petrolatum can be effectively removed in a regulated solvent extraction step, the specific process being highly effective to remove such organic material essentially quantitatively from pre-chopped scrap material. In a preferred embodiment of the invention, the process is a continuous one, making feasible efficient, economical recovery of valuable conductors in an unoxidized state and petrolatum filler.

11 Claims, 1 Drawing Figure

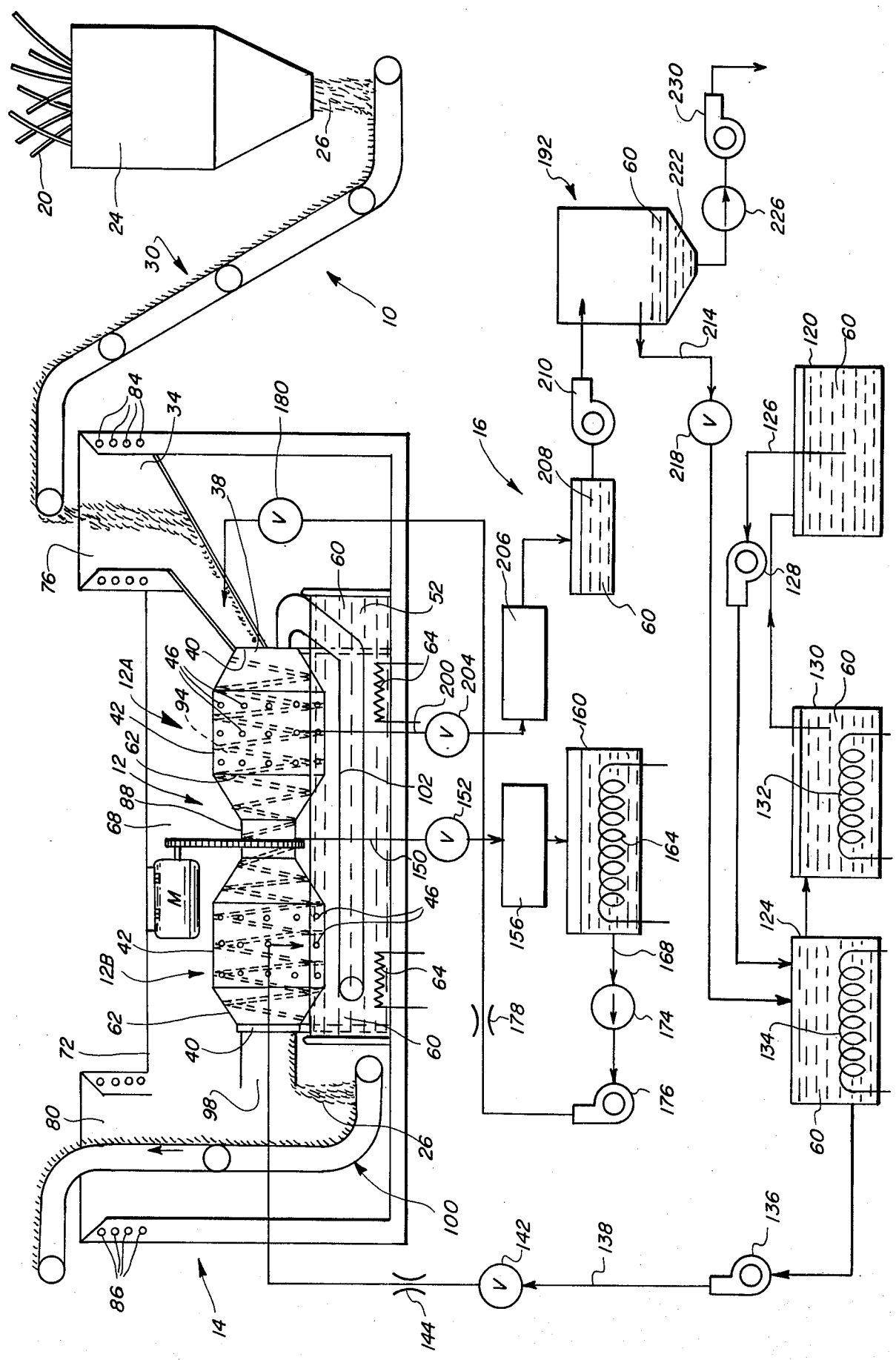

RECLAMATION OF CONDUCTIVE WIRE FROM CABLE

BACKGROUND OF THE INVENTION

This invention relates to the recovery of electrical conductors such as copper and aluminum from cable, particularly scrap cable. More particularly, the invention is directed to an improved process and apparatus whereby insulative cladding as well as organic fillers such as petroleum jelly are essentially quantitatively separated from the conductive metal element of cables to provide an unoxidized product which may be conveniently and economically reprocessed for re-use in electrical and other industries.

The recovery or reclamation of conductive wire from cables including electrical cables and telephone cables is a practice well established in the art, and various techniques have been used in an effort to devlop improved procedures. Substantially all of the prior art processes include a mechanical chopping step to reduce the cable into convenient incremental lengths to facilitate handling and treatment.

A technique which has been used extensively in the past is to subject particulate cable to a combustion step to burn off the organic components. It will be appreciated that this particular procedure poses serious air contamination problems and ecological hazards. In addition, the conductive metal, for example copper, is undesirably oxidized during the process. In other prior art processes an autoclaving step is used to remove the insulative sheaths from cables, particularly sheaths of plastic material such as polyvinylchloride. The "cooking" step in the autoclave is carried out in the presence of an "oil" which may be a petroleum distillate. This process is extremely sensitive and demands careful control of the ratio of plastic to the metal which is subjected to the treatment. It is also highly sensitive to the type of plastic sheathing involved. The autoclaving serves merely to render the sheathing material brittle and it is then necessary to remove the sheathing itself in mechanical processing operations.

In the case of cables containing petrolactum-type fillers, clay or diatomaceous earth has been used as an "absorbant" to remove the filler. The technique is inefficient and far from satisfactory.

The scrap material available for reclamation of conductors derives from various sources, and the cable itself may vary in its physical composition and construction. Each particular conductor-sheathing material poses special problems in any reclamation process, and no single process is completely suitable for treating all cable presently being reclaimed. It is to the recovery of electrical conductors from a particular type of cable, namely telephone cable, that the present invention is primarily directed.

SUMMARY OF THE INVENTION

The present invention is directed to the recovery of the conductor elements from scrap telephone cable. Such cable ordinarily include multiconductors encased in either a single or in a compound jacket. Air space within the jacket and between the individual wires is filled with a petrolatum jelly type of material or other organic material such as amorphous plastics the purpose of which is to prevent the infusion of moisture into the cable from the ambient system. The presence of moisture in the zone surrounding the conductors impairs the insulative or dielectric value of the sheathing and adversely affects the performance or useful life of the cable. While the organic gel or jelly performs a commendable role in such telephone cables, the gel poses difficult problems in any reclamation process. It is in the solution of these problems and in the provision of an effective and efficient reclamation process for the type of cable described that the present invention finds utility.

The method of the invention includes both mechanical and chemical unit operations or processes. Initially, the cable is mechanically chopped into convenient incremental segments from about ½-4 inches long to facilitate material handling and flow. Additionally, the chopping renders the interior of the cable accessible for more effective extraction of the organic filler material. The chopped segments are transported into a continuous extraction system containing an organic solvent such as a halogenated hydrocarbon, methylene chloride being preferred. The particulate segmented scrap is conveyed into and through the solvent, with agitation, the solvent being maintained at an elevated temperature to enhance and accelerate the extraction process.

In a preferred embodiment of the invention the transport of the segmented scrap through and in contact with the solvent is effected by means of a revolving drum-like reactor through which the cable segments advance. The rotating drum is perforated to permit through flow of solvent and to facilitate agitation of the solvent. Ultimately, the hot vapor phase of the solvent also acts directly on the material being processed. The apertures in the extraction vessel permit influx and discharge of solvent into and from the extraction vessel, and vane-like baffles within the vessel itself are oriented so as mechanically to transport or advance the material lengthwise through the elongated extraction vessel from its input port to its discharge port during rotation of the vessel. The solvent is preferably maintained at a boiling temperature throughout the process with new, "clean" solvent being introduced continuously. Condenser means at the input or infeed throat or port of the apparatus and at the discharge port obviate the escape of solvent and solvent fumes into the ambient atmosphere.

The solvent flow cycle shown in the drawing has been found to be remarkably effective for achieving the purposes of the invention. Clean solvent from a storage tank is pumped into a holding tank where it is heated to the boiling point. The hot clean solvent is then pumped into the interior of a rinse section (second section) of the rotating reactor in which the solvent overflows and passes through filters into a semi-clean storage tank which is also heated. The partially clean solvent is then pumped into the wash section (first section) of the rotating reactor where the filler gel and tar are dissolved, the gel-laden solvent flowing from the rotating drum to a degreaser tank. The "dirty" solvent from the wash section overflows into an automatic filter system and is delivered to a solvent holding tank from which the solvent is pumped into a recovery still. Reclaimed, clean solvent from the still is returned to the clean, heated holding tank for use in the rinse section of the process.

The petroleum jelly and other contaminants removed in the extraction process are pumped from the bottom of the still into a secondary still (not shown) and holding tank where the balance of the solvent is recovered. In the practice of the present invention more than 98% of the solvent used is recovered for re-use. The sludge is discharged to storage.

An important feature of the invention is the sizing of the apertures in the rotating drum. In accordance with the practice of the invention it has been found that these apertures must be large enough to prevent "blinding" or mechanical blocking and yet not be so large as to permit a major quantity or fraction of material to pass through into the solvent tank. Rather, the sizes of the apertures are so selected as to permit a relatively small fraction of the material to drop through the openings. The particulate cable segments which do "escape" through the rotating drum are recaptured in a system of conveyors and returned to the interior of the drum for completion of the cycle. In the embodiment of the invention depicted, the openings in the drum are roughly 3 inches in diameter, but may be 2"×4" ovals, or may be of irregular shapes. It will be appreciated that these dimensions are related to the sizes of the particulate cable segments, with the requirement that some of these segments will fall through. The combination of the sized apertures in conjunction with helical flights or vanes carried on the interior wall surface of the rotating drum provides a unique and highly effective flushing and washing action by which the gel is essentially quantitatively removed from the cable.

Upon discharge of the extracted gel-free cable segments from the rotating extractor, the segments are subjected to mechanical operations including floatation procedures in which the metallic and non-metallic materials are effectively separated, such a separation having been rendered feasible and practical through the previous removal of the gel and tar.

BRIEF DESCRIPTION OF THE DRAWING

FIG. 1 is a schematic represenation of the process of the invention depicting the operative mechanical elements of the processing equipment. The graphic representation is not intended to be either limiting or all inclusive, but serves to facilitate a description of those elements which constitute components of the novel processing steps and apparatus of the present invention.

DESCRIPTION OF PREFERRED EMBODIMENT

For purposes of illustrative disclosure and not by way of limitation, the process of the present invention and the apparatus involved are described herein with reference to apparatus illustrated schematically in the drawing. The various component elements of the apparatus involved are arranged somewhat arbitrarily and it is not suggested that the particular spacial orientation corresponds to the physical arrangement in an actual plant. Rather, the arrangement is primarily functional.

Viewed generally, the apparatus of the invention includes a raw material preparation and loading station 10, a reactor or extractor 12 with a wash section 12A and a rinse section 12B, a product discharge and recovery station 14, and a solvent supply and recovery system 16.

Referring now to the drawing itself, the travel of the cable material through the reaction system is from right to left, and the initial solvent station is indicated at the lower right extremity. The various operational steps in the process of the invention will be conveniently understood upon consideration of the drawing itself. As shown, pieces of scrap cable 20 such as random length telephone cable are delivered to a chopper 24 where the cable is reduced mechanically to smaller lengths or segments 26. These segments 26 are deposited on a conveyor 30 which delivers the particles to and discharges them into a hopper or chute 34 to flow by gravity into an open end 38 of a first section 12A of a horizontally supported 40 rotating drum-like extractor or reactor 12 the bounding wall 42 of which is provided with apertures 46 or perforations extending therethrough. The reactor 12, which is about 9 feet in diameter and about 32 feet long, is so supported as to be at least partially immersed in an open-top tank or bath 52 containing a liquid solvent 60 in which the extractor 12 revolves, at about 2 rpm or about 1 foot per second. In the embodiment of the invention shown, about 120 holes are provided in each drum section. The tank 52 is provided with internal heaters 64 which maintain the solvent 60 at an elevated temperature preferably at or near the boiling temperature so that the supernatant gaseous atmosphere 68 in which the upper portion 62 of the reactor 12 revolves is essentially saturated with the vapor of the extracting liquid 60. An enveloping chamber or housing 72 in which the extraction tank 52 and the rotatable reactor 12 are contained is open to atmosphere at each of its opposed input 76 and exhaust 80 ends. Accordingly, in order to minimize the undesirable release of solvent vapors to the ambient system, cooling coils 84 and 86 are provided in the throat-like input zone 76 and the discharge zone 80 to isolate and contain the fluid and vapor system thereby to eliminate health hazards and obviate environmental contamination, and control solvent loss.

Coupled to the wash section 12A of the reactor 12 through a reduced neck-like conduit 88 is a rinse section 12B into which the cable segments 26 from the wash section 12A are delivered for further solvent extraction. In the particular embodiment of the apparatus depicted, the reactor is provided on its internal wall surface with flutes or convoluted vanes 94 oriented so as continuously to advance the cable segments from the input end of the system 38 to the discharge port 98 as the reactor revolves. The vanes 94 are conveniently on 12"–18" centers and also serve to agitate and to "advance" the material through the reactor 12.

Upon discharge from the exhaust port 98 of the rotating reactor 12, the cable segments 26, now free of solvent-soluble gels, petrolatum, or other inpregnants are deposited on a conveyor 100 and carried up through the apparatus, out the cooled exit port 80 to the ambient environment, and transported to subsequent stations in which the conductive wire is mechanically separated from other materials, such as insulation, associated therewith. These latter operations, may include magnetic separation, air classification and screening, all of which techniques are well known. Accordingly, no detailed description is provided herein.

As previously described, the wash section 12A and rinse section 12B of the rotating reactor 12 are each provided with a plurality of apertures 46 through which the solvent flows into and from the reactor 12 as the drum assembly revolves in the solvent bath 52. During development of the process of the present invention it was discovered that if these apertures were so sized as effectively to preclude the passage of any of the cable segments therethrough, the apertures would become clogged and effectively blocked so that the circulation of solvent was materially and objectionably impaired. Extraction of the gel from the cable became impossible. It is an important feature of the invention that the problem was solved by selecting the sizes of the apertures to be such that some, but a relatively small fraction, of the cable segments, in the order of from about 2% to about 20%, and preferably about 10% of the material introduced into the reactor, drops through the apertures. With the mechanical arrangement described, the apertures do not block but remain open so that the extracting fluid may circulate through the reactor as the latter revolves in the solvent bath.

As indicated schematically in the drawing, there is provided in the solvent tank 52, a conveyor or transport assembly 102 onto which the material discharged through the apertures 46 with fall and be returned to the reactor 12 for recycling. This material is reintroduced directly through the input port 38 of the wash section 12A of the extractor 12.

The mechanical handling and conveying apparatus by which the cable segments are fed into, treated in, and discharged from the extraction apparatus having been described, the following paragraphs set forth a preferred embodiment of the solvent handling system 16 by which the extracting solvent 60 is delivered for use, cleansed, recovered, and recirculated. Referring again to the drawing, the original supply of solvent is conveniently contained in a storage tank 120 from which it is delivered to an intermediate holding tank 124 by means of piping 126 and a conventional liquid handling pump 128. Tanks 120 and 124 contain clean solvent only, methylenechloride being preferred for the purposes of the invention. Surplus solvent is transferred from the holding tank 124 to an auxiliary tank 130 provided with a cooler 132. Other halogenated hydrocarbons or mixtures of such solvents with petroleum distillate fractions may be used, with appropriate safeguards and precautions to obviate fire hazards and to prevent contamination of the atmosphere.

Solvent from the storage tank 120 delivered to the holding tank 124 is heated by an internal steam coil 134 or other suitable heating means. Hot solvent from the tank 124 is conveyed by means of a pump 136 into a solvent delivery line 138 provided with a control valve 142 and a regulator 144, the hot, clean solvent being introduced into the reaction system by way of the rinse section 12B of the reactor or extractor assembly 12 so that the rinse section 12B is continuously fed with clean circulating solvent which impinges upon and flushes the cable segments 26 in the rinse section and is then discharged through the apertures into the solvent bath 52.

A level-control and overflow line 150 delivers solvent 60 from the extraction tank 52 through a valve 152 to a filter 156, the filtered solvent being then delivered to a tank 160 provided with a heater 164. The tank 160 has a solvent discharge line 168. This line delivers washing solvent through a control valve 174, a pump 176, a control 178 and a secondary control 180 to the first or wash section 12A of the extractor 12.

The solvent system is provided with a second level-control overflow line 200 in the region of the wash section 12A whereby solvent in that zone is delivered through a control valve 204 and a filter 206 to a tank 208. The discharge from the tank 208 is transferred by a pump 210 to the solvent recovery still 192. The distillate from the solvent recovery still 192 is delivered through a line 214 and control valve 218 to the clean solvent tank 124. In the system described the input of solvent is from about 1000-1800 gallons per hour and solvent is circulated through the reactor 12 at the same rate. The sludge-like residue 222 produced in the distillation operation is transferred through a control valve 226 and pump 230 to storage, and a secondary still, not shown.

The process of the invention provides an effective and highly efficient technique whereby the organic gel-like impregnant in the cable segments is removed to prepare the material for subsequent mechanical treatment to isolate the metallic conductor as an end product.

It will be appreciated from the foregoing description that the mechanical and the solvent supply and recovery system are each susceptible of many and varied modifications all of which come within the concept of the subject invention. The detailed disclosure herein is provided to illustrate the principles of the operation and not in any limiting sense, and persons skilled in the art having the benefit of the instant disclosure will be able to make many modifications and revisions for accomplishing the same end, without departing from the teachings of the invention. Accordingly, the scope of the invention is to be determined from the appended claims as interpreted through the foregoing specification.

What is claimed is:

1. A process for the reclamation of conductive wire from cable which includes sheathing material and which contains a filler soluble in a heated organic solvent, and for the recovery of the filler and the sheathing, said process comprising:
mechanically converting the cable into convenient incremental segments to permit flow through a material handling system and to facilitate solvent extraction of said filler from said cable segments,
transporting said segments to and feeding said segments into an extraction system containing an organic solvent in which said filler is soluble,
conveying said segments into and through said solvent contained in a wash station of said system,
mechanically agitating said segments in said solvent in a revolving drum-like extraction vessel of said system in said wash station, said drum-like extraction vessel being formed with a plurality of spaced apertures in a bounding wall thereof to permit entry and exit of said solvent into and from said vessel in extraction of said filler from said segments,
discharging through said apertures of said drum-like vessel a minor fraction of said segments introduced into said extraction vessel, providing conveyor means for receiving the fraction of discharged segments, and redirecting the discharged segments into said extraction vessel,
circulating said solvent in said vessel to extract said segments and to separate said filler therefrom,
discharging said segments from said wash station of said vessel substantially free of said filler,
providing isolating zone means, including solvent vapor condensing means, between said extraction system and the ambient environment to prevent atmospheric air from intermixing with said organic solvent and solvent vapor container in said extraction system,
transporting said segments from said extraction system through said isolating zone means, and
discharging said segments to the ambient environment.

2. The process as set forth in claim 1 and including the step of progressively advancing said segments through said extraction vessel generally along a rotational axis thereof through circulating solvent.

3. The process as set forth in claim 2 and further comprising the step of discharging said segments from said wash station of said vessel into a rinse station, and rinsing residual contaminated solvent from said segments with fresh organic solvent.

4. The process as set forth in claim 1 and further comprising the step of heating said solvent, and wherein said vessel containing said segments to be extracted is rotated while at least partially immersed in said heated solvent.

5. The process as set forth in claim 1 wherein said solvent is heated to or near boiling preparatory to delivery to said vessel containing said segments to be extracted, thereby to provide a vapor phase as well as a liquid phase extracting medium.

6. The process as set forth in claim 1 and further comprising the step of recovering said solvent for purification and re-use.

7. The method as set forth in claim 1 and further comprising mechanically separating said conductive wire from non-metallic solid material associated therewith, such as fibrous and plastic sheathing.

8. The process as set forth in claim 1 wherein the fraction of said segments discharged through said apertures of said vessel and redirected into said extraction vessel is in the order of from about 2% to about 20% of the material fed into said extraction system.

9. The process as set forth in claim 1 including the step of passing said segments through saturated vapor of said solvent during extraction of filler from said segments.

10. Apparatus for the reclamation of conductive wire from cable having sheathing material and containing a filler soluble in an organic solvent, said apparatus comprising:

chopping means for converting said cable into incremental segments of a size to permit flow of said segments through a material handling system and to facilitate solvent extraction of said filler from said segments, an extraction vessel, feeding means for delivery of said segments into said extraction vessel, and for discharge of said segments therefrom, solvent reservoir means for holding a supply of fluid, passage means for entry of fluid into and discharge of fluid from said extraction vessel, fluid flow regulating means for controlling introduction of solvent into and removal therefrom from said extraction vessel, conduit means for delivery of solvent from said reservoir means to said extraction vessel, an immersion tank containing solvent for extraction of said filler from said cable segments, said extraction vessel comprising an elongated drum-like reactor having longitudinally spaced material input and discharge ports, means rotatably supporting said extraction vessel for rotation about a generally horizontal axis, with at least a portion of said extraction vessel extending into said immersion tank and contacting said solvent, said extraction vessel being formed with a plurality of apertures extending through a bounding wall thereof to permit influx and discharge of solvent into and from said extraction vessel, said apertures being so sized with respect to said segments that a minor fraction of said segments introduced into said extraction vessel pass through said apertures, conveyor means for receiving the fraction of said segments which pass through said apertures and for redirecting the fraction of said segments into said extraction vessel, baffle-like vane means within said extraction vessel carried on an interior wall surface thereof, said vane means being effective to agitate said solvent and being oriented to transport material longitudinally through said extraction vessel between said input and discharge ports during and responsive to rotation of said extraction vessel, heater means for heating said solvent circulating in said immersion tank and through said extraction vessel, isolation zone means including condenser means interposed between said extraction vessel and the ambient environment to prevent atmospheric air from intermixing with said organic solvent and solvent vapor contained in said extraction vessel, and means for transporting said segments through said isolation zone means to discharge said segments to the ambient environment.

11. The appartus as set forth in claim 10 wherein said condenser means is supported at an elevation above an uppermost extremity of said extraction vessel.

* * * * *